July 21, 1942.   A. D. RAKOV, KNOWN AS A. D. RAY   2,290,572

STOVE UTILITY DRAWER

Filed Jan. 23, 1941

WITNESSES
A B Wallace.
V. A. Peckham.

INVENTOR
Abraham D. Rakov,
BY Known as Abraham D. Ray
Brown, Critchlow & Flies
his ATTORNEYS.

Patented July 21, 1942

2,290,572

UNITED STATES PATENT OFFICE 2,290,572

STOVE UTILITY DRAWER

Abraham D. Rakov, known as Abraham D. Ray, Pittsburgh, Pa., assignor to May, Stern & Co., Pittsburgh, Pa., a corporation of Pennsylvania Application January 23, 1941, Serial No. 375,560

2 Claims. (Cl. 126—339)

This invention relates to cook stoves and, in particular, to a drawer assembly for such stoves.

Modern cook stoves, especially gas and electric stoves, are generally provided with a compartment for storing cooking utensils, such as pots, pans, baking dishes and the like. The compartment sometimes takes the form of a cupboard while in other stoves it may contain a drawer, but in any case no particular provision has been made for keeping the utensils in neat and orderly arrangement therein. As a result, the housewife has had to spend the time and endure the inconveniences necessitated by the fact that she usually has to hunt through a pile of cooking utensils for the one she wants, and to often first remove many of them from the stove compartment to get at the desired one.

Another shortcoming of the modern stove is that it lacks the useful warming oven so generally found in the old wood and coal ranges. Some heat may seep into the utensil-storing compartment from the oven, but this requires the oven to be hot at the time, and the heat transfer is not great enough any way for much more than taking the chill off the compartment.

It is among the objects of this invention to provide a stove drawer assembly which is adapted for storing cooking dishes in a manner that has a neat appearance, which is formed for holding each dish in a predetermined and readily accessible position, and which is provided with means for heating those dishes. By "cooking dish" is meant any vessel in which food is cooked or is placed before or after cooking.

In accordance with this invention a stove drawer is provided with areas formed for receiving cooking dishes and removably holding them in place in predetermined locations. A simple and efficient manner of accomplishing this is to fit into the drawer a shelf that has openings in its top adapted to receive various types of cooking dishes and support them in spaced relation. Preferably the drawer is also equipped with suitable means, for example, a separate heating unit, for warming or preheating dishes and food placed in the drawer.

Figure 1:
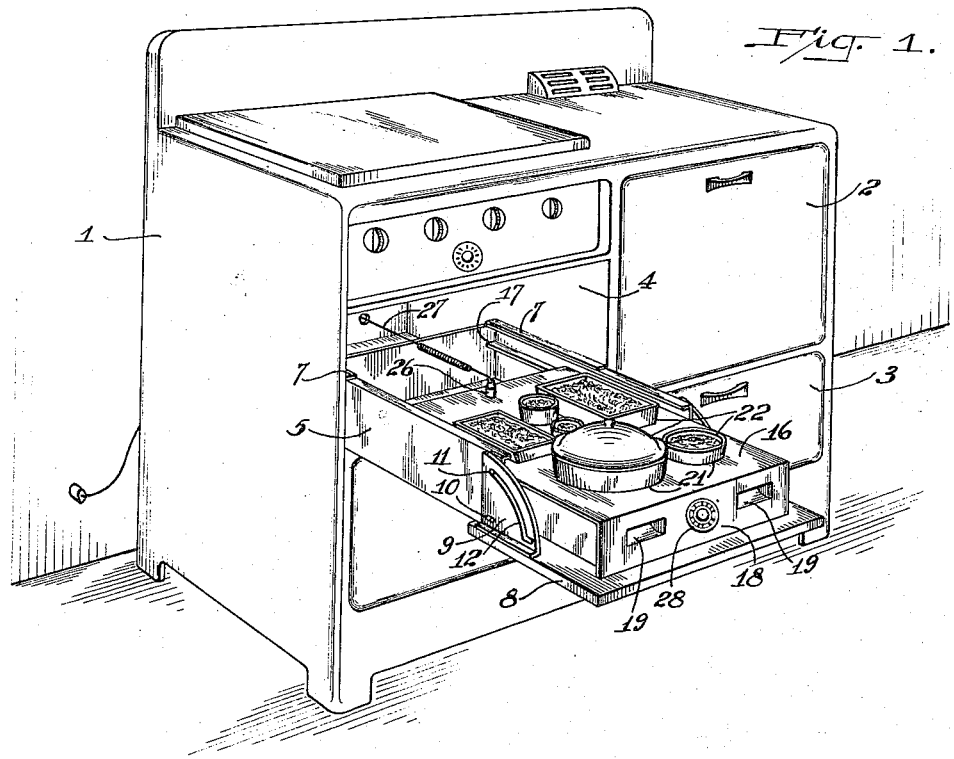
Figure 2:
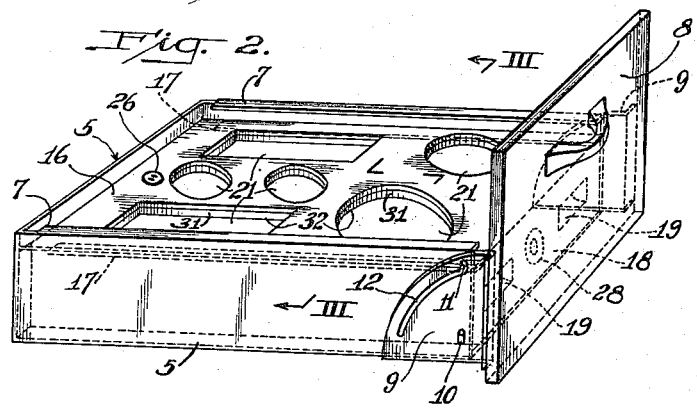
Figure 3:
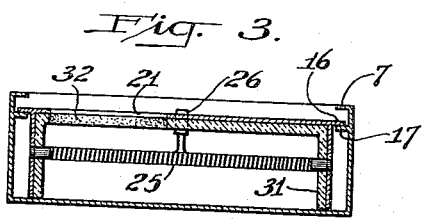

The preferred embodiment of the invention is illustrated in the accompanying drawing of which Fig. 1 is a perspective view of a cook stove provided with my stove drawer assembly shown pulled outwardly from the stove; Fig. 2 is an enlarged perspective view of the drawer assembly by itself with its front panel closed; and Fig. 3 is a vertical section taken on the line III—III of Fig. 2.

Referring to Fig. 1 of the drawing, a cook stove 1 is provided in some convenient location not occupied by the oven 2 or the broiler 3, with a forwardly opening compartment 4 in which a drawer 5 is mounted. This drawer is slidably supported and guided by any suitable means, such as by horizontal ledges 7 on the opposite side walls of the compartment, so that the drawer can be pulled forward from the front of the stove. The front panel 8 of the drawer is preferably pivotally connected to the sides of the drawer so that it can be swung forward and downward into a horizontal position substantially in line with the bottom of the drawer. This may be done by means of vertical triangular plates 9 secured to the back of panel door 8 near its ends and overlapping the sides of the drawer from which pins project into short slots 10 in the plates. Above these pins other pins 11 project into arcuate slots 12 in the plates for limiting the downward movement of the door and for locking it in upright closed position (Fig. 2).

It is a feature of this invention that the drawer is provided in predetermined locations with areas formed for holding several dishes of different types in certain spaced positions. Although these areas may be formed in the drawer itself, I prefer to use a shelf 16 which is disposed in the drawer and slidably mounted therein so that it can be pulled forward in the drawer when door 8 is lowered as shown in Fig. 1. The shelf rests on horizontal ledges 17 (Fig. 3) projecting inwardly from the sides of the drawer, and is provided with a front wall 18 in which there are recessed handles 19 for pulling the shelf forward. For holding dishes in predetermined positions the top of the shelf is preferably provided with a plurality of openings 21 of different shapes and sizes for receiving the lower portions of dishes 22 of corresponding shapes and sizes. These openings may be formed for accommodating standard dishes, or may be of special sizes and shapes for receiving dishes made especially for such a drawer assembly and sold with the stove in order to provide a fitted utility drawer. In other words, within the limits of this drawer assembly there is a place for everything so that everything may be kept in its place in a neat and orderly manner.

Another feature of this invention is that provision is made for heating stove compartment 4 in order to preheat dishes and food contained therein or to keep the food warm or hot after it has been cooked. This heating may be done by means of a separate heating element within the compartment, such as a gas burner or electric element, or it may be done by extending the flue from the oven through the compartment. The particular heating means shown in the drawing consists of an electric resistance element 25 (Fig. 3) mounted within the drawer assembly itself so that it will be in close proximity to the dishes projecting down through the top of shelf 16. This electric element may be mounted in the drawer in any convenient manner, it being shown connected to the downwardly extending side walls of the shelf. The element is electrically connected to a socket 26 mounted in the rear of the shelf, and the socket is connected by an electric cord 27, which passes through the back of the stove, to a suitable electric outlet in the wall of the house in which the stove is installed. The electric current for element 25 is controlled by an electric control (not shown) mounted in the front of the shelf and provided with an actuating dial 28 on its front wall.

To concentrate the heat around the bottoms of dishes 22 it is preferred to provide the top of the shelf and its side and end walls with a lining 31 of heat insulating material. The lining for the top of the shelf is provided with openings 32 registering with openings 21 in the shelf so that the bottoms of the dishes will not be insulated by the lining from the heat within the drawer.

It will thus be seen that a drawer assembly constructed in accordance with this invention permits each cooking dish to be kept in a readily accessible position that does not require the removal of other dishes first in order to reach the desired dish, and the drawer always has a neat appearance when it is pulled out from the stove. Also, the dishes and food in the drawer can be warmed or kept warm without operating the rest of the stove, this being a great convenience and money saver. By having the dishes arranged in spaced relation in close proximity to the source of heat, instead of being stacked helter-skelter within the storage compartment, the most efficient use is made of the heat therein.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A stove drawer assembly comprising a drawer having a front panel door, a shelf slidably mounted therein and adapted to be pulled forward when said door is open, said shelf being provided with a plurality of recesses for receiving cooking dishes and removably holding them in predetermined positions, and heating means disposed under said shelf for heating said dishes.

2. A stove drawer assembly comprising a drawer having a front panel door, a shelf slidably mounted therein and adapted to be pulled forward when said door is open, said shelf being provided with a plurality of recesses for receiving cooking dishes and removably holding them in predetermined positions, heating means disposed under said shelf for heating said dishes, and means connected to the front of the shelf and exposed for manual actuation when said door is open for controlling said heating means.

ABRAHAM D. RAKOV,
*Known as Abraham D. Ray.*